United States Patent
Okai et al.

(10) Patent No.: US 6,898,057 B2
(45) Date of Patent: May 24, 2005

(54) THIN FILM MAGNETIC HEAD HAVING MULTIPLE LAYERED FILMS DETERMINING TRACK WIDTH IMBEDDED IN AN INSULATING FILM AND METHOD OF MANUFACTURING THE SAME

(75) Inventors: Tetsuya Okai, Odawara (JP); Makoto Morijiri, Ninomiya (JP); Yoji Maruyama, Iruma (JP); Kimitoshi Etoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 154 days.

(21) Appl. No.: 10/372,803

(22) Filed: Feb. 26, 2003

(65) Prior Publication Data

US 2004/0100730 A1 May 27, 2004

(30) Foreign Application Priority Data

Nov. 27, 2002 (JP) .................................. 2002-343176

(51) Int. Cl.[7] ............................................. G11B 5/147
(52) U.S. Cl. ................................... 360/126; 29/603.15
(58) Field of Search ........... 360/126; 29/603.13–603.16

(56) References Cited

U.S. PATENT DOCUMENTS 6,504,677 B1 * 1/2003 Han et al. ................... 360/126
6,724,572 B1 * 4/2004 Stoev et al. ................. 360/126
6,801,407 B2 * 10/2004 Sasaki et al. ................ 360/317

FOREIGN PATENT DOCUMENTS

JP            2002-8209          1/2002

* cited by examiner

Primary Examiner—A. J. Heinz
(74) Attorney, Agent, or Firm—Antonelli, Terry, Stout & Kraus, LLP

(57) ABSTRACT

The present invention is to provide a thin film magnetic head intended to increase precision of and to narrow a width which determines a track width of a write thin film magnetic head and to supply a stably high output substantially free from write blurring on a disk, and a method for manufacturing the same. The thin film magnetic head consisting of a magnetic circuit comprising a read head to read information, a lower magnetic film, a magnetic gap and an upper magnetic film formed with a magnetic gap between it and the lower magnetic film; and of a write head comprising a coil positioned between the upper magnetic film and the lower magnetic film and an insulating film for insulting the coil and the upper magnetic film from each other, wherein the upper magnetic film is configured of an upper first magnetic film, an upper second magnetic film and an upper third magnetic film, and the upper first magnetic film is connected to the upper third magnetic film via the upper second magnetic film.

20 Claims, 13 Drawing Sheets

UPPER ↑
AIR BEARING ↕
SURFACE ↓ LOWER

FIG. 7A
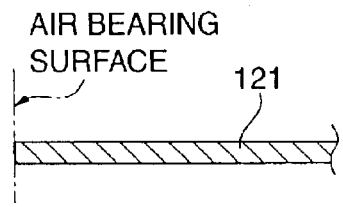
FIG. 7B
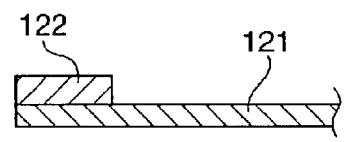
FIG. 7C
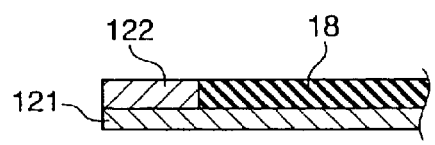
FIG. 7D
FIG. 7E
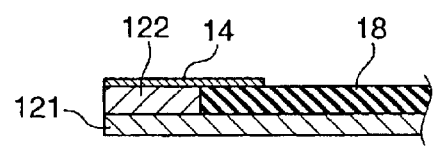
FIG. 7F
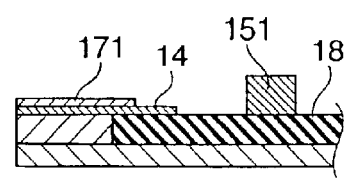
FIG. 7G
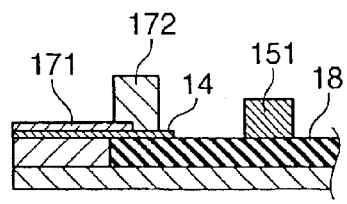
FIG. 7H
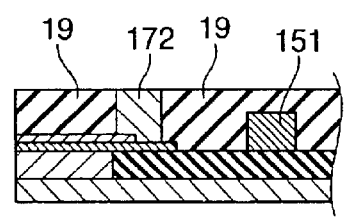
FIG. 7I
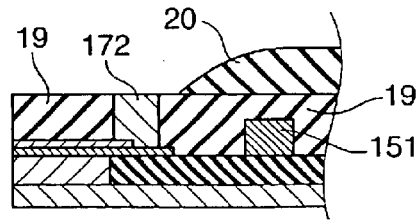
FIG. 7J
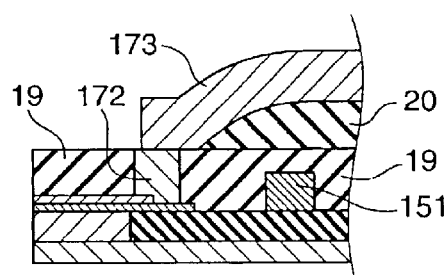

THIN FILM MAGNETIC HEAD HAVING MULTIPLE LAYERED FILMS DETERMINING TRACK WIDTH IMBEDDED IN AN INSULATING FILM AND METHOD OF MANUFACTURING THE SAME

BACKGROUND OF THE INVENTION

1. Field of the Invention

The present invention relates to a thin film magnetic head for use in head disk assemblies (HDAs) such as magnetic disk apparatuses, and more particularly to a thin film magnetic head compatible with high recording density, excelling in recording performance, and a method for manufacturing the same.

2. Description of the Prior Art

In recent years, along with the capacity enlargement of computers, the requirement for higher recording density of magnetic disk apparatuses is increasing more and more. In this connection, an ever narrower width is required for thin film magnetic heads to be mounted on magnetic disk apparatuses, as the width determines the track width of magnetic cores mounted thereon, and the requirement for their manufacturing accuracy is becoming increasingly stringent. Furthermore, the recording performance is also required to be high enough to prevent blurred recording of signals onto the magnetic disk and to ensure a high output stably.

FIG. 2 is a section of the essential part of a thin film magnetic head according to the prior art whose coil is structured in a single layer, and FIG. 3 is a perspective view of the same. As shown in FIG. 2, the air bearing surface of the magnetic head is supposed to be at the left end of the magnetic head as viewed in the drawing. In the following description, the upward direction in FIG. 3 means the upward direction in the magnetic head; the downward direction in FIG. 3, the downward direction in the magnetic head; the direction corresponding to that of the air bearing surface of the magnetic head shown in FIG. 2, the direction of the air bearing surface; and the direction of the width determining the track width of the magnetic recording medium, the track width direction. These definitions apply not only to FIG. 2 or FIG. 3 but also to all other sectional views or perspective views cited in this specification.

To add, FIG. 2, FIG. 3 and all other sectional views or perspective views appended to the present application show only the essential part of the magnetic head on its air bearing surface side, but no illustration is made of the portions of the magnetic head in the direction reverse to that of the air bearing surface or in the downward direction of the magnetic head. However, it goes without saying that the unillustrated portions are compatible with all kinds of magnetic heads.

As shown in FIG. 2, the thin film magnetic head is configured of a read head section and a write head section successively formed of a substrate 11 consisting of alumina-based ceramics.

The read head is formed of insulating film, a lower shield film 111, a magnetoresistive film 10 and an upper shield film 112, all formed over the substrate 11. As the magnetoresistive film 10, one of various kinds of elements that are sensitive to a magnetic field and can take out a read output, such as an AMR element, a GMR element or a TMR element, can be used.

The write head is separated from the read head by an insulating film, and is configured of a lower magnetic film 12 formed to be coated with a magnetic film, a magnetic gap film 14 which is a non-magnetic film of a metallic oxide, such as $SiO_2$ or $Al_2O_3$, formed over the lower magnetic film 12, a first insulating layer 13, a conductor coil layer 15, both formed over the magnetic gap film 14, a second insulating layer 16 formed over these layers, and an upper magnetic film 17 formed over the magnetic gap film 14 and the second insulating layer 16 and constituting, together with the lower magnetic film 12, a magnetic core which forms a magnetic circuit.

This configuration results in the formation, at the tip of a track, a magnetic gap between the upper magnetic film 17 and the lower magnetic film 12. Incidentally, the conductor coil layer 15 passes between the upper magnetic film 17 and the lower magnetic film 12 and crosses the magnetic circuit. In the write element portion of the thin film magnetic head so far described, the upper magnetic film 17, the lower magnetic film 12 and the magnetic gap (the magnetic gap film 14) at the tip of the track constitute the air bearing surface portion of a thin film head slider, and writes information onto a magnetic disk (not shown).

The recording density of such a thin film magnetic head according to the prior art is determined mainly by the shape of the upper magnetic film. The particularly important factors of the shape include the width of the upper magnetic film 17 which determines the track width, the pole length (the thicknesses of the lower magnetic film 12 and the upper magnetic film 17) which determines write capabilities including overwriting capability, the thickness of the magnetic gap which determines the resolution, and the position of the throat height=0. All these factors should be formed with high precision.

Of these factors, forming the width of the upper magnetic film 17 which determines the track width requires accurate formation of a pattern of a portion of the lower magnetic film 12, which is positioned close to the lower part of a level gap formed of an insulating film of about 10 μm in height (the portion where the first insulating layer 13, the conductor layer 15 and the second insulating layer 16 where they are stacked in full height) and a portion of the upper magnetic film 17 opposite the lower magnetic film 12 with the gap film 14 in-between. These two magnetic films are formed by a method known as pattern plating or frame plating, usually employing a photoresist pattern for masking. The photoresist pattern should preferably be thin in film thickness in order to keep the width which determines the track width narrow and to form a highly accurate pattern.

In forming the pattern, the resolution which is the limit value of width formation to determine the track width is represented by $k·\lambda/NA$, where k is a coefficient, $\lambda$ is the wavelength of the light to which the pattern is exposed and NA is the numerical aperture of the lens. The focal depth, which is the reference for the region coming into focus in pattern formation, is represented by $k·\lambda/(NA)^2$. These relations indicate that, in order to make the resolution fine, it is required either to shorten the exposure wavelength or to enlarge the numerical aperture NA of the lens. This, however, would make the focal depth shallow, namely narrow the region in focus at the time of pattern formation, and therefore the pattern would not be resolved sufficiently unless the resist film thickness is thin. In other words, the thinner the resist film thickness, the shorter the exposure wavelength or the smaller the numerical aperture NA of the lens can be. Thus it is thereby made possible to make the resolution finer, narrow the width that determines the track width and achieve highly accurate formation.

Where the photoresist pattern is to be applied to a portion of a high level gap formed by the second insulating layer 16 as shown in FIG. 2, the characteristic of the application is such that the photoresist pattern tends to be formed thicker toward the bottom of the gap, in a thickness of 10 μm for instance. This greater thickness of the photoresist in the position where the width to determine the track width is to be formed makes too thick relative to the required plating thickness of the magnetic film and thereby makes it correspondingly more difficult to form a highly accurate pattern.

There is also adopted a method by which, as shown in FIG. 3, the blurring that occurs when writing signals onto a disk is minimized to achieve high density magnetic recording by making identical the widths of the upper magnetic film 17 and the lower magnetic film 12, opposite each other with the gap film in-between, in the track width.

Furthermore with a view to forming the width to determine the track width with high precision, studies are being made on a method to form with high precision the width of the upper magnetic film 17 in the position of the air bearing surface in a state in which the level gap of the insulating film is low, i.e. the width in the direction of the write track width for the purpose of forming a highly precise photoresist pattern by thinning the thickness of the applied photoresist to the necessary minimum.

For instance, the Japanese Patent Application Laid-open No. 2002-8209 discloses a magnetic head whose upper magnetic film is configured of an upper first magnetic film constituting the upper pole and an upper second magnetic film to function as the upper yoke. The thickness of the photoresist is reduced to about 4 microns, making it possible to form a pattern whose width to determine the track width can be as small as about 0.3 micron.

A section of a magnetic head according to the prior art, whose upper magnetic film is configured of two magnetic films, is shown in FIG. 12. After forming a first insulating layer 18, only the tip portion 182 of the upper magnetic film is formed and, after forming a protective film 19 for the tip portion, an insulating film 20 and the rear portion 183 of the upper magnetic film are formed. This method has a feature that, as the track width is determined by the width of the tip portion 182 of the upper magnetic film in the direction of the track width, the width of the upper magnetic film in the direction of the track width can be formed highly accurate in a state of a low level gap in which only the first insulating film 18 is formed. Moreover, since the protective film is provided over the magnetic film which constitutes the track, no variation in pole length occurs from processing in the subsequent manufacturing process, according to the patent application.

The prior art stated in the Japanese Patent Application Laid-open No. 2002-8209 takes no account of a method of forming the width, as narrow as no more than 0.3 micron, which determines the track width. In order to realize a width as narrow as 0.3 micron or less, it will be necessary to further reduce the thickness of the photoresist or to take some other measure.

Further it is desirable to make flat the surface of what is formed first of the two split potions of the upper magnetic film, and this is done by polishing the surface flat by a CMP technique or etching back, for instance after embedding the insulating film. This makes it necessary to take into consideration fluctuations of the quantity of polishing by CMP or any other method as tolerance, and accordingly prohibits a sufficient reduction in the film thickness of the photoresist.

This problem will be discussed in more specific terms with reference to FIGS. 13A to 13G. FIGS. 13A to 13G are diagrams showing how the tip portion of the upper magnetic film of the magnetic head of the structure shown in FIG. 12, for instance, is formed as viewed from the air bearing surface.

First, as shown in FIG. 13A, after the lower magnetic film 12 and the magnetic gap film 14 are formed, the photoresist 181 is formed so that the width of the tip portion 182 of the upper magnetic film in the direction of the track width determine the track width.

Then, as shown in FIG. 13B, the tip portion 182 of the upper magnetic film is formed using the photoresist 181. After that, as shown in FIG. 13C, the photoresist 181 is removed and, for dimensional adjustment of the tip portion 182 of the upper magnetic film, a part each of the lower magnetic film 12, the magnetic gap film 14 and the tip portion 182 of the upper magnetic film is removed as shown in FIG. 13D. After the dimensional adjustment, the insulating film 19 is formed as shown in FIG. 13E.

Next, as shown in FIG. 13F and FIG. 13G, the tip portion 182 of the upper magnetic film and the insulating film 19 is flattened by CMP, etching back or otherwise. Here, it is necessary to form the tip portion 182 of the upper magnetic film thicker than the required minimum film thickness in advance to allow for the tolerance of fluctuations in the machining of the flat surface in the flattening process. Correspondingly, the photoresist 181 should also be made thicker.

SUMMARY OF THE INVENTION

The present invention provides a thin film magnetic head that permits accurate formation of the width to determine the track width of the upper magnetic film and a method for manufacturing the same.

In the thin film magnetic head according to the invention, an upper magnetic film section is configured of an upper first magnetic film, an upper second magnetic film and an upper third magnetic film, wherein the upper first magnetic film is connected to the upper third magnetic film via the upper second magnetic film. A lower magnetic film section is configured of a lower second magnetic film in contact with a magnetic gap, and a lower first magnetic film of which one end is connected to the lower second magnetic film and the other end is connected to the upper third magnetic film to constitute a magnetic circuit.

This enables the upper first magnetic film to be formed for the main purpose narrowing the width to determine the track width and the upper second magnetic film to be formed sufficiently thick to allow for the tolerance of the machining to flatten the surface of the insulating film after it is formed.

Further in the method for manufacturing the thin film magnetic head configured as described above, the process of forming the upper magnetic film section comprises a step of coating the magnetic gap film with a magnetic film to form the upper first magnetic film, a step of coating with a conductor film to form an upper conductor coil layer, a step of coating with a magnetic film to be in contact with the upper first magnetic film to form the upper second magnetic film, a step of coating each of these films with an insulating film of resin-based material or a non-magnetic metallic oxide film, a step of flattening the surface of the upper second magnetic film and the insulating film, and a step of coating with a magnetic film to be in contact with the upper second magnetic film to form the upper third magnetic film.

On the other hand, the process of forming the lower magnetic film comprises a step of coating with a magnetic film to form the lower first magnetic film and a step of coating with a magnetic film to be in contact with the first magnetic film to form the lower second magnetic film which determines the position of a lower throat height=0.

BRIEF DESCRIPTION OF THE DRAWINGS

FIGS. 7A to 7J are sectional diagrams illustrating a method for manufacturing the thin film magnetic head, which is the second preferred embodiment of the invention.

DETAILED DESCRIPTION OF PREFERRED EMBODIMENTS

The preferred embodiments of the present invention will be described below with reference to accompanying drawings.

Figure 1:
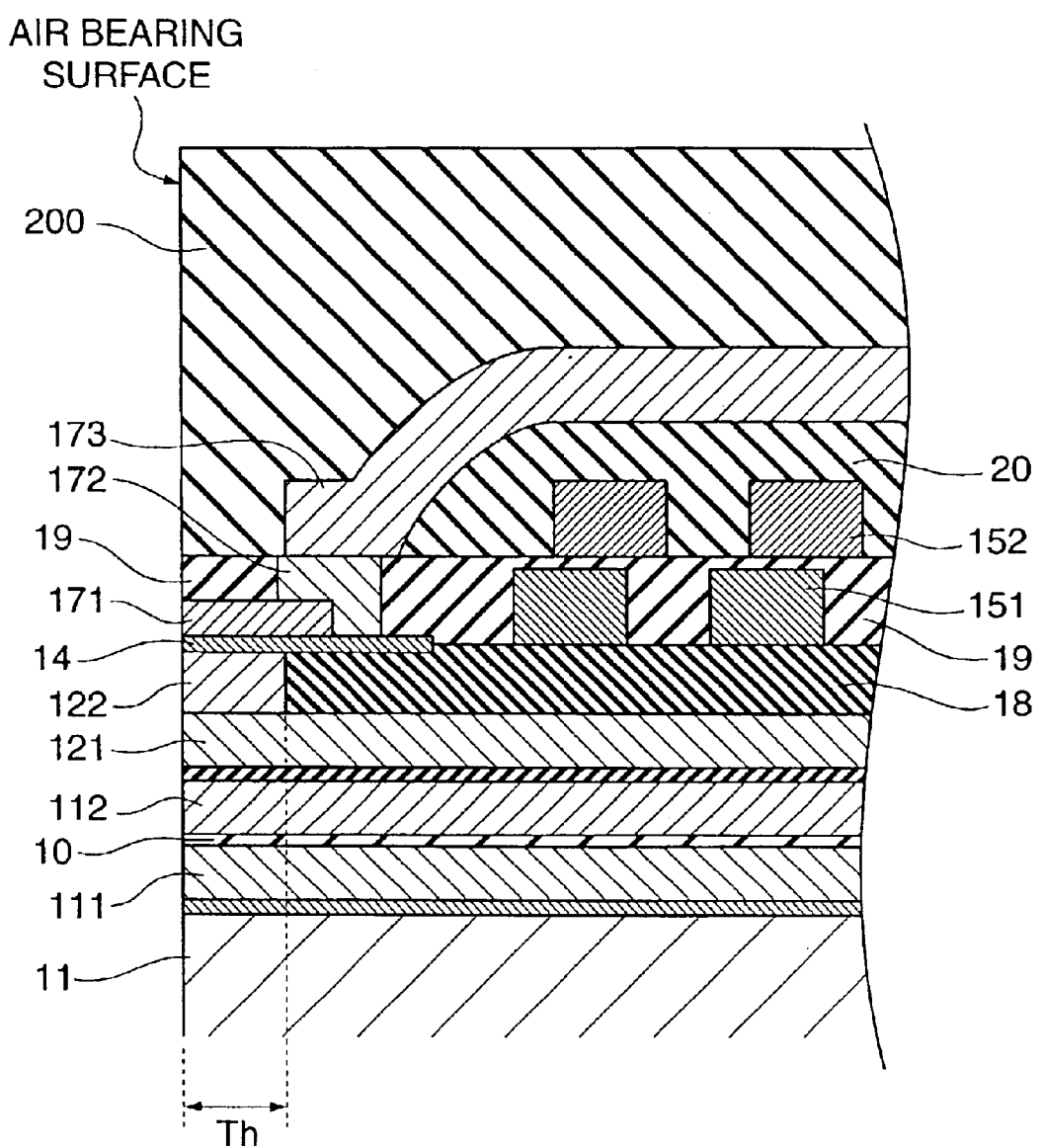
FIG. 1 is a sectional view of the essential part of a thin film magnetic head, which is a first preferred embodiment of the present invention.
Figure 4:
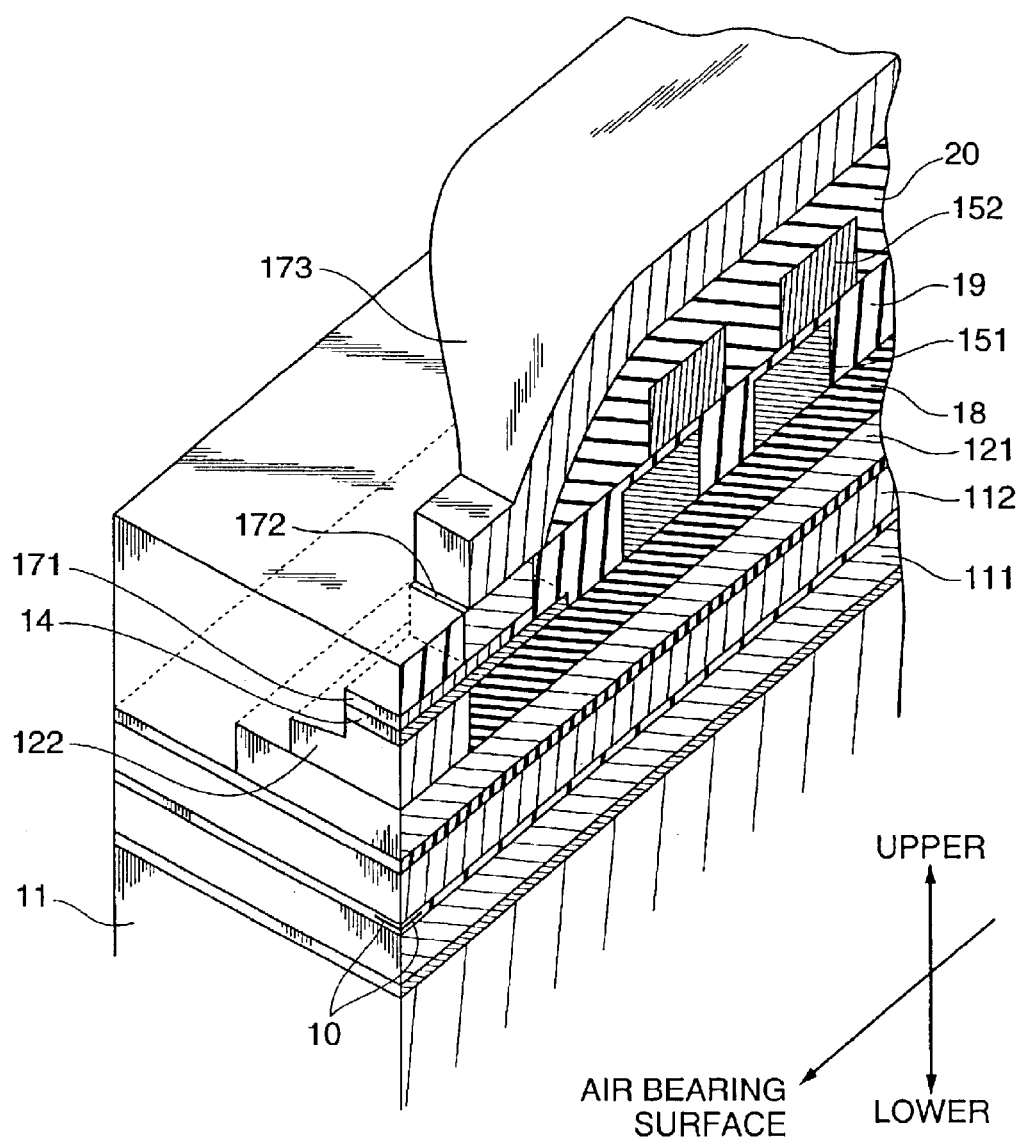
FIG. 4 is a sectional perspective view of the thin film magnetic head, which is the first preferred embodiment of the invention.

FIG. 1 is a sectional view of the essential part of the thin film magnetic head, which is the first preferred embodiment of the invention. This drawing illustrates in particular the tip portion of the thin film magnetic head on the air bearing surface side. FIG. 4 is a sectional perspective view of the essential part of the thin film magnetic head, the same first preferred embodiment of the invention.

The thin film magnetic head in this mode of implementing the invention is formed by successively stacking a read head section and a write head section over a substrate 11 consisting of alumina-based ceramics.

First, an insulating film is formed over the substrate 11, followed by successive formation of a lower shield film 111, a magnetoresistive film 10 and an upper shield film 112 to constitute the read head section. Next, another insulating film to separate the read head and the write head from each other is formed.

Then, the write head section is formed. First, the lower first magnetic film 121 is formed, and on the air bearing surface of this lower first magnetic film 121 is formed a lower second magnetic film 122 having a protruding portion trimmed to the track width. The rear end portion of the lower second magnetic film 122, the other side than the air bearing surface, constitutes a position Th which determine the throat height=0. Next, over the lower first magnetic film 121 at the rear end of the lower second magnetic film 122 is stacked an insulating film 18, and the surface of the lower second magnetic film 122 and the insulating film 18 is flattened. On this surface is formed a magnetic gap 14, and an upper first magnetic film 171 is formed so as to be opposite the lower second insulating film 122 via the magnetic gap 14. The lower second magnetic film 122 and the upper first magnetic film 171 constitute the tip portion of the track part. To add, it is preferable here to form in the same size the protruding portion of the lower second magnetic film 122, and the width to determine the track widths of the magnetic gap film and the upper first magnetic film 171. This could reduce write blurring.

Also, a first conductor coil layer 151 is formed over the insulating film 18, and an upper second magnetic film 172 is formed to be connected to rear end portion of the upper first magnetic film 171 on the other side than the air bearing surface. The circumference of the upper second magnetic film 172 and the first conductor coil layer 151 is covered with the insulating film 19, and the surface is flattened. Then, a second conductor coil layer 152 is formed over the insulating film 19, and their circumference is covered with an insulating film 20. An upper third magnetic film 173 is formed over the insulating film 20, and its tip portion on the air bearing surface side is connected to the upper second magnetic film 172. Also, the upper third magnetic film 173 is connected to the lower first magnetic film 121 at the rear end on the other side than the air bearing surface to constitute a magnetic circuit. Further, the upper first magnetic film 171 here is so positioned as to have its width in the direction of the track width to determine the track width, and the second magnetic film 172 and the upper third magnetic film 173 are positioned away from the air bearing surface so that their widths in the direction of the track width may not determine the track width.

Figure 2:
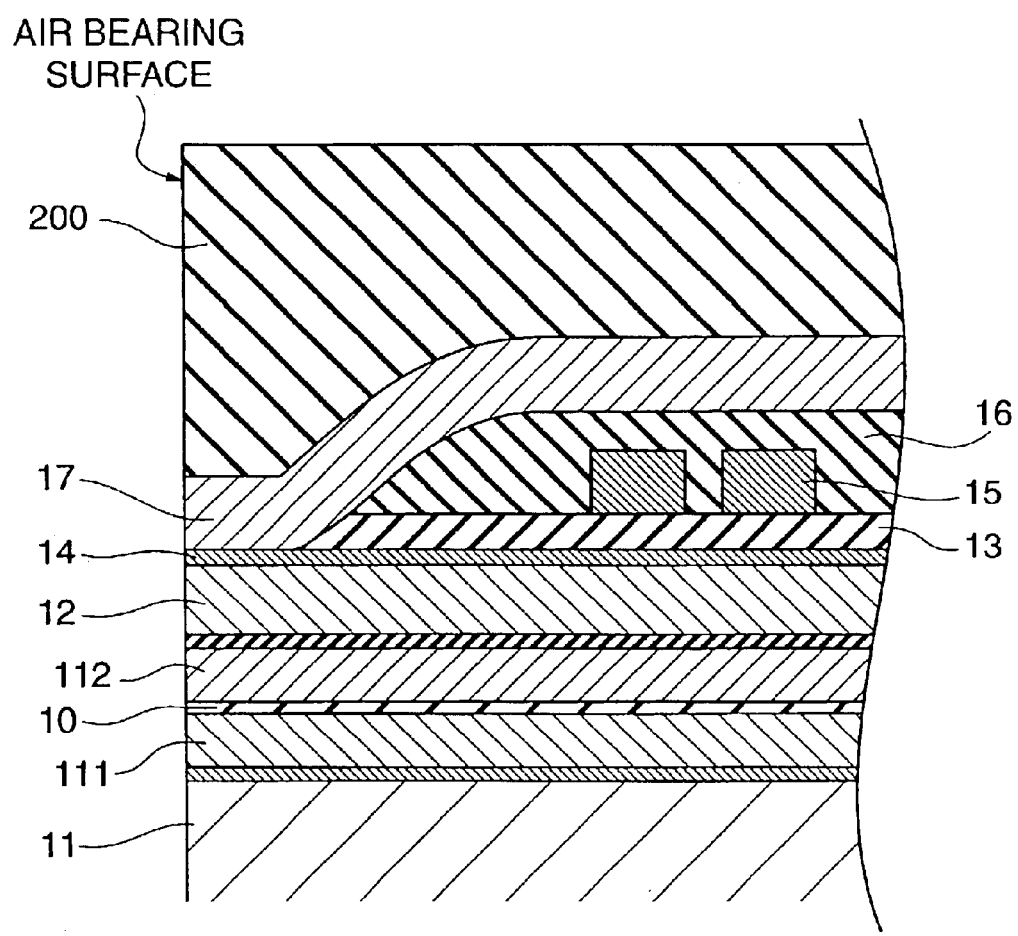
FIG. 2 is a section of the essential part of a thin film magnetic head according to the prior art whose coil is structured in a single layer.
Figure 3:
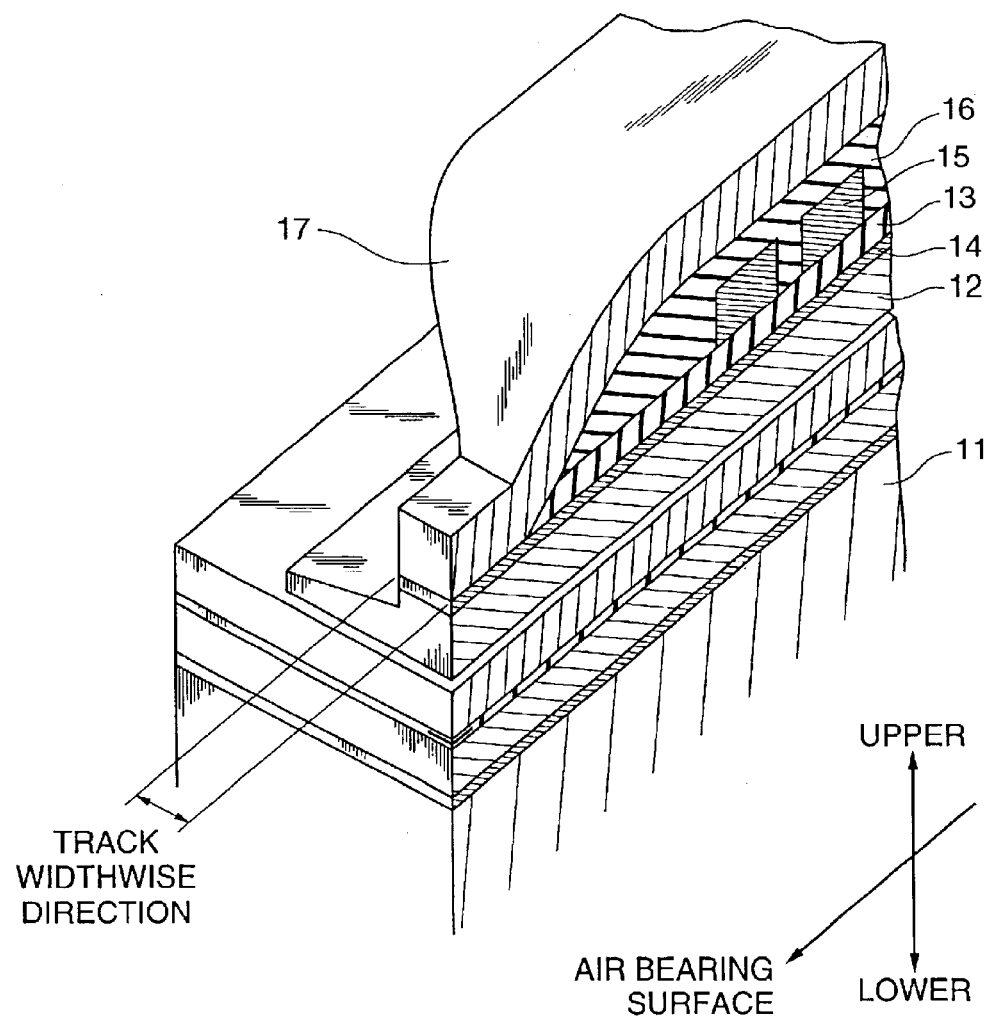
FIG. 3 is a sectional perspective view of the essential part of the thin film magnetic head according to the prior art whose coil is structured in a single layer.

Hereupon, the thin film magnetic head in this mode of implementing the invention will be described in comparison with the thin film magnetic head according to the prior art shown in FIG. 2. The upper first magnetic film 171, the upper second magnetic film 172 and the third magnetic film 173 of the thin film magnetic head in this mode of implementation are products of the splitting of the counterpart to the upper magnetic film section 17 the upper magnetic film section 17 of the thin film magnetic head according to the prior art. The lower first magnetic film 121 and the lower second magnetic film 122 also are split products of the counterpart to the lower magnetic film 12 of the prior art head.

This embodiment of the invention is characterized in that, after the lower first magnetic film 121 is formed, the lower second magnetic film 122 to determine the position Th of the throat height=0 is formed over the lower first magnetic film 121. By forming the lower second magnetic film 122 so as to determine the position Th of the throat height=0, leaking of the magnetic flux can be controlled and the write performance improved.

A further characteristic is that the substrate surface is flattened after that with the insulating film 18 and, after forming the magnetic gap film 14 over it, the upper first magnetic film 171 having the width to determine the track width is formed. As the upper first magnetic film 171 to determine the track width can be formed over this flat surface, it is possible to thin the photoresist film thickness and form the width to determine the track width narrow and highly accurately.

This embodiment of the invention is characterized by the split into the upper first magnetic film 171 and the upper second magnetic film 172, making it possible to use a photoresist of a smaller film thickness to form the track part emerging on the air bearing surface of the thin film magnetic head and a photoresist of a greater film thickness to form the flat surface.

For instance, the minimum pattern width of the upper first magnetic film 171 can be reduced to about 0.2 micron by use of a photoresist of about 2 microns in thickness. It has been confirmed that this formation is possible with a stepper using a KrF excimer laser of an optical exposure system. It has further been confirmed that, if an even thinner pattern is to be formed, the thickness of the photoresist can be reduced to about 1 micron, which would make possible formation of a pattern with a width of about 0.1 micron even by electron beam lithography. It is also possible to form a narrow pattern by using a shorter wavelength exposure light from an ArF excimer laser or the like.

Since the upper first magnetic film 171 in this embodiment of the invention needs to be produced only to meet the main purpose of forming a narrow track, the decrease in film thickness due to the aforementioned flattening need not be allowed for in the tolerance. For this reason, it is necessary to produce a magnetic film of no more than the essentially required thickness, and therefore the thickness of the photoresist can also be reduced, making it possible to form a narrow track pattern.

Although the surface of the upper second magnetic film 172 needs polishing by CMP or etching back to flatten it, the minimum width of its pattern is not so narrow as in the track part, and therefore the photoresist can be formed thick. Furthermore, the thickness of the upper second magnetic film 172 can be increased to allow for the tolerance of the polishing process. The width of the upper second magnetic film 172 here in the track width direction is greater than that of the upper first magnetic film 171. Thus, while the upper first magnetic film 171 is positioned in contact with the air bearing surface, the upper second magnetic film 172 and the upper third magnetic film 173 are positioned away from the air bearing surface because they do not determine the track width.

Characteristically, the thickness of the upper first magnetic film 171 is thinner than the film thickness of the coil 151. Thus, since the upper first magnetic film 171 is formed for the purpose of narrowing the width determining the track width, it can be formed thinner than the coil 151 in thickness. Especially, as the second magnetic film 172 corrects the level gap arising from the thickness difference between the first magnetic film 171 and the coil 151 by serving as a spacer and thereby forms the same surface as and a flat surface equal in height to the insulating film 19, this configuration is made possible.

Another characteristic is the formation of the insulating film 19 over the upper first magnetic film 171. Thus, as the insulating film 19 is formed after the first magnetic film 171, the coil 151 and the second magnetic film 172 are formed, the first magnetic film 171 does not form the same surface as and a flat surface equal in height to the insulating film 19, and instead realizes narrowing of the width to determine the track width.

Thus, the formation of the upper third magnetic film 173 after flattening the surface of the upper second magnetic film 172 followed by the formation of the coil 152 and an insulating film 20 to complete a magnetic circuit makes it possible to produce a magnetic head suitable for high recording density.

Also, as the first conductor coil 151 can be formed to have a flat surface, it is possible to form a narrow pitch coil and accordingly a magnetic head suitable for high speed transfers. It is made possible for the second conductor coil 152, as for the first conductor coil 151, to form the upper second magnetic film 172 and to be formed over the substrate whose surface has been flattened using the insulating film 19, thereby making possible the formation of a narrow pitch coil.

By forming the insulating layer 20 after that, the upper third magnetic film 173 is electrically insulated from the second conductor coil 152. The upper third magnetic film 173 is formed over that insulating layer 20 and connected to the upper second magnetic film 172 at the tip portion on the air bearing surface side.

FIGS. 5A to 5K are sectional diagrams illustrating a method for manufacturing the thin film magnetic head, which is the first preferred embodiment of the invention.

The manufacturing process will be described below with reference to these FIGS. 5A to 5K. In the following description of this process, the read head section will be skipped. In FIGS. 5A to 5K and FIGS. 7A to 7J to be cited afterwards, the left end of the magnetic head in the drawing is the air bearing surface.

Figure 5A:
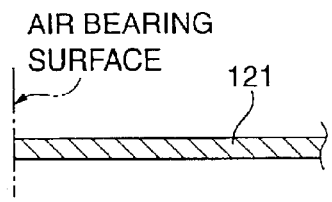
FIGS. 5A to 5K are sectional diagrams illustrating a method for manufacturing the thin film magnetic head, which is the first preferred embodiment of the invention.

First, a magnetic film of Co-based amorphous or Fe, Ni or Co-based material is coated by sputtering or plating, and the lower first magnetic film 121 is formed by wet etching, ion milling, dry etching or lifting-off (FIG. 5A).

Figure 5B:
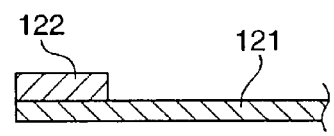

Next, the lower second magnetic film 122 is formed over this lower first magnetic film 121 to determine the position Th of the throat height=0 and increase the output of the write magnetic field (FIG. 5B). The lower second magnetic film 122 is coated with a magnetic film of Co-based amorphous or Fe, Ni or Co-based material is coated by sputtering or plating, and formed by wet etching, ion milling, dry etching or lifting-off. In this process, by use of a material of a higher saturated magnetic flux density for the lower second magnetic film 122 than that for the lower first magnetic film 121, the variation of the write magnetic field is made steeper, contributing more to increasing the output of the write magnetic field. Then, the track width may be determined by the width on the air bearing surface side of the lower second magnetic film 122, but it is also possible to form by ion million or otherwise a protruding portion for determining the track width on the air bearing surface side of the lower second magnetic film 122.

Figure 5C:
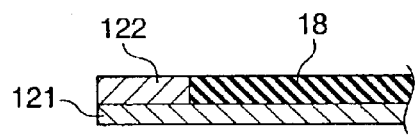

After that, the lower first magnetic film 121 and the lower second magnetic film 122 are coated with the insulating film 18 of a resin-based material or a non-magnetic film of a metallic oxide, such as $SiO_2$ or $Al_2O_3$. It is preferable then to flatten the substrate surface by etching back, which is a method of selective etching by dry etching, ion milling or otherwise, or by chemical-mechanical polishing (CMP) (FIG. 5C).

Figure 5D:
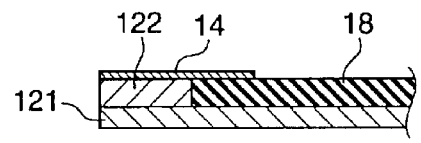

Next, the magnetic gap film 14 is coated by sputtering or plating, and formed by wet etching, ion milling, dry etching or lifting-off. It is preferable to use as the material of the magnetic gap film 14 a non-magnetic film of a metallic oxide such as $SiO_2$ or $Al_2O_3$, a non-magnetic film of a metal such as Cr, Cu, Au, Mo, Pd, Rh or Pt, or an alloy thereof (FIG. 5D).

Figure 5E:
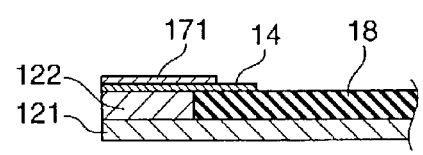

After that, the magnetic gap film 14 is coated with a magnetic film of Co-based amorphous or Fe, Ni or Co-based material, by sputtering or plating, and the upper first magnetic film 171 is formed by wet etching, ion milling, dry etching or lifting-off. In this process, by use of a material of a higher saturated magnetic flux density for the upper first magnetic film 171 than that for the upper second magnetic film 172 to be described afterwards, the variation of the write magnetic field is made steeper, contributing more to increasing the output of the write magnetic field. Using, for the upper first magnetic film 171, a laminated material in which the saturated magnetic flux density is varied would also give a similar effect. It goes without saying that the saturated magnetic flux density of the surface to be in close contact with the magnetic gap film 14 should be increased then (FIG. 5E).

By forming the width to determine the track width of the upper first magnetic film 171 equal to the width to determine the track width of the magnetic gap film 14 and the lower second magnetic film 122, write blurring can be reduced.

Figure 5F:
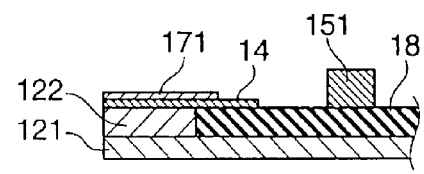

Next is formed the first conductor coil layer 151 for inducing a magnetic field. The first conductor coil layer 151 is formed by coating with a conductor film of Cu, Au or the like sputtering or plating, followed by wet etching, ion milling, dry etching or lifting-off (FIG. 5F). In this process, as the first conductor coil layer 151 is formed on a flat surface, it is made possible to use a thin masking photoresist. This enables a narrow pitch coil to be formed, there making available a thin film magnetic head excelling in high speed transfer performance.

Figure 5G:
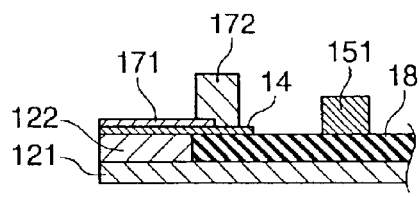

After that, the upper second magnetic film 172 is formed in the position connecting to the rear end of the upper first magnetic film 171 by coating with Co-based amorphous or Fe, Ni or Co-based material by sputtering or plating, followed by wet etching, ion million, dry etching or lifting off. In this process, by use of a material of a lower saturated magnetic flux density for the upper second magnetic film 172 than that for the upper first magnetic film 171, the variation of the write magnetic field is made steeper, contributing more to increasing the output of the write magnetic field. Using, for the upper second magnetic film 172, a laminated material in which the saturated magnetic flux density is varied would also give a similar effect. It goes without saying that the saturated magnetic flux density of the surface to be connected to the upper first magnetic film 171 should be increased then within a limit of not surpassing the value used for the upper first magnetic film 171 (FIG. 5G).

Figure 5H:
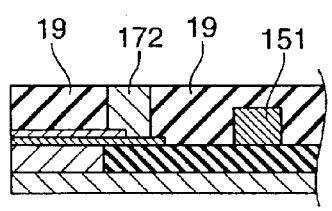

After that, the insulating film 19 of a resin-based material or a non-magnetic film of a metallic oxide such as $SiO_2$ or $Al_2O_3$ is formed by coating. Stacking of a combination of these materials would give a similar effect. It is preferable then to flatten the surface of the insulating film 19 by etching back, which is a method of selective etching by dry etching, ion milling or otherwise, by CMP or otherwise (FIG. 5H).

Figure 5I:
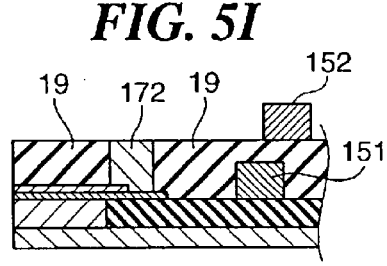

Next is formed the second conductor coil layer 152 for inducing a magnetic field. The second conductor coil layer 152 can be formed in the same way as the first conductor coil layer 151 was (FIG. 5I).

Figure 5J:
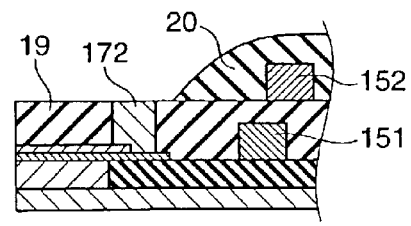

Then to achieve insulation from these conductor coil layer 152 and upper third magnetic film 173, the insulating layer 20 of a resin-based material or a non-magnetic film of a metallic oxide such as $SiO_2$ or $Al_2O_3$ is formed by coating (FIG. 5J). At this stage, even if three or four conductor coil layers are formed instead of only the second conductor coil layer 152, the formation can be accomplished in a similar way to the case in which the second conductor coil layer 152 and the insulating layer 20 are stacked one over the other alternately.

Figure 5K:
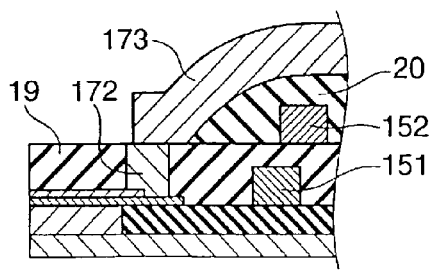

Finally, a magnetic film of Co-based amorphous or Fe, Ni or Co-based material is coated by sputtering or plating, and the upper third magnetic film 173 is formed by wet etching, ion million, dry etching or lifting off so as to be connected onto the upper second magnetic film 172 (FIG. 5K). In this process, if a material with a high resistivity is used for the upper third magnetic film 173, eddy current loss can be reduced to provide a thin film magnetic head suitable for high frequency recording.

Further, it is also possible to form over the upper first magnetic film 171 the protective film 19 of a non-magnetic film of a metallic oxide such as $SiO_2$ or $Al_2O_3$ for protecting the upper first magnetic film 171 by sputtering, ion million or lifting off. Whereas the protective film 19 is also formed from the central portion backward over the first insulating film 18 in this case, it goes without saying that a contact hole for magnetically connecting (splicing) the first magnetic film 171 and the upper second magnetic film 172 should be formed at least.

(Embodiment 2)

Figure 6:
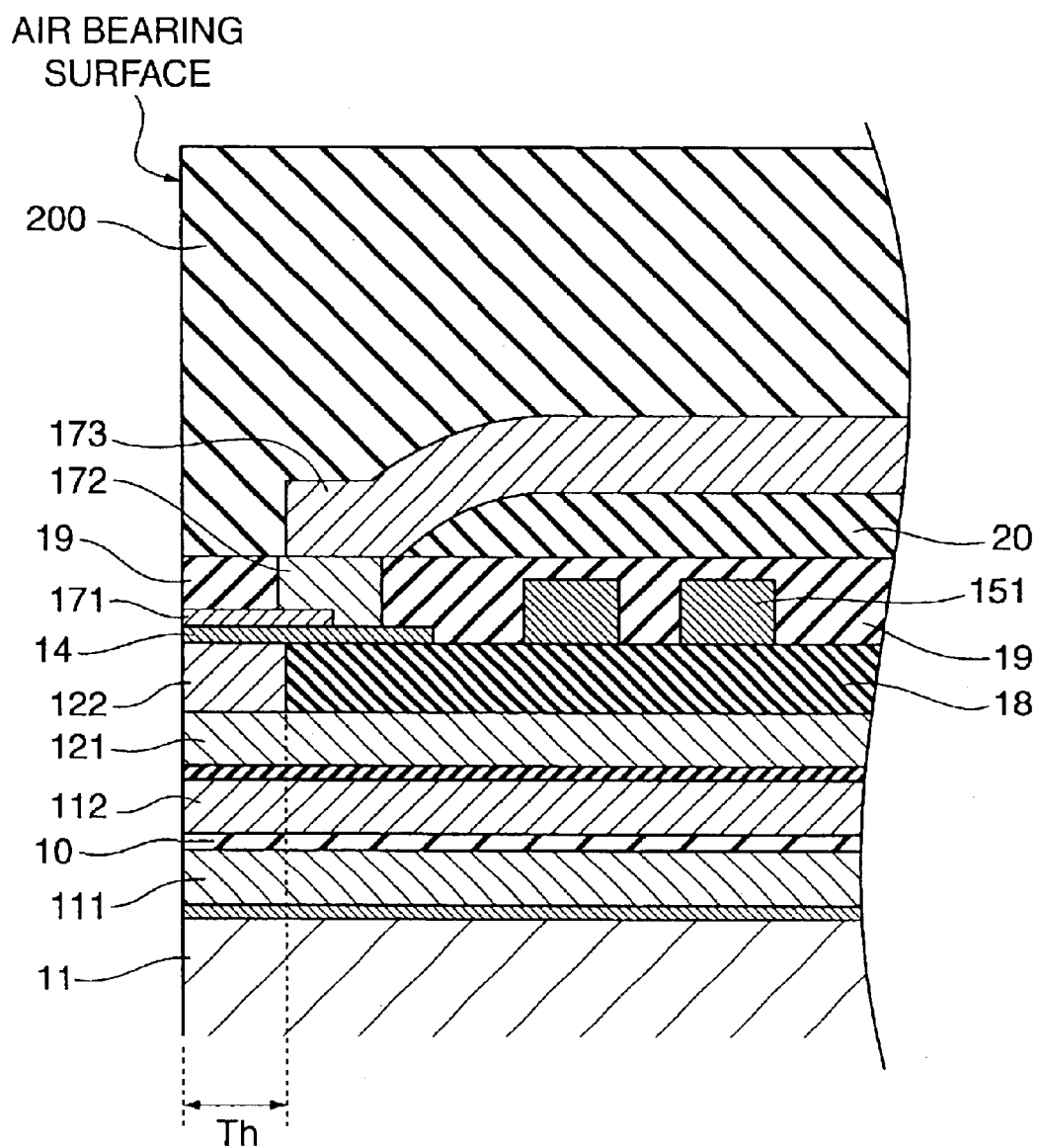
FIG. 6 is a sectional view of a thin film magnetic head, which is a second preferred embodiment of the invention.

A sectional view of a thin film magnetic head, which is a second preferred embodiment of the invention, is shown in FIG. 6. As shown in FIG. 6, the thin film magnetic head in this mode of implementing the invention is an example of structure having a single layer of conductor coil in contrast to the first embodiment whose structure has two layers of conductor coils.

This drawing illustrates the tip portion of the thin film magnetic head. The description of the read head section is dispensed with because it has the same structure as its counterpart in the first embodiment. In the write head section, the lower first magnetic film 121 and the lower second magnetic film 122 are successively formed. The surface is flattened with the insulating film 18, and the upper first magnetic film 171 is formed to be opposite the lower second magnetic film 122 via the magnetic gap 14.

The lower second magnetic film 122 and the upper first magnetic film 171 constitute the tip portion in the track part. The position Th of the throat height=0 then is determined by the rear end of the lower second magnetic film 122. Further, the first conductor coil layer 151 is formed over the insulating film 18, and the upper second magnetic film 172 is formed so as to be connected to the upper first magnetic film 171. The circumferences of the upper second magnetic film 172 and the first conductor coil layer 151 are covered with the insulating film 19 and their surfaces are flattened. The upper third magnetic film 173 is formed over the insulating layer 20, and its tip portion is connected to the upper second magnetic film 172.

Since the upper first magnetic film 171 having the width to determine the track width is formed on a flat surface then, the resist film thickness can be thinned to make it possible to narrow the width to determine the track width and to form it precisely. This enables a magnetic head suitable for a high recording density to be formed.

Further, as the first conductor coil 151 is also formed on a flat surface, it is made possible to form a narrow pitch coil and accordingly to produce a magnetic head suitable for high speed transfers.

FIGS. 7A to 7J are sectional diagrams illustrating a method for manufacturing the thin film magnetic head, which is the second preferred embodiment of the invention. Basically, the method for manufacturing the thin film magnetic head in the second mode of implementing the invention is a single coil layer version of the first embodiment whose structure has two layers of conductor coils. More specifically, out of FIGS. 7A to 7J, 7A to 7H are similar to the manufacturing method illustrated in FIGS. 5A to 5H.

As shown in FIG. 7H, the insulating film 19 is formed by coating and after its surface is flattened by etching back, which is a method of selective etching by dry etching, ion milling or otherwise, by CMP or the like, the insulating layer 20 of a resin-based material or a non-magnetic film of a metallic oxide such as $SiO_2$ or $Al_2O_3$ is formed by coating to insulate the conductor coil layer 151 and the upper third magnetic film 173 from each other as shown in FIG. 7I.

Finally, a magnetic film of Co-based amorphous or Fe, Ni or Co-based material is coated by sputtering or plating, and the upper third magnetic film 173 is formed by wet etching, ion million, dry etching or lifting off so as to be connected onto the upper second magnetic film 172 (FIG. 7J). In this process, if a material with a high resistivity is used for the upper third magnetic film 173, eddy current loss can be reduced to provide a thin film magnetic head suitable for high frequency recording.

(Embodiment 3)

Figure 8:
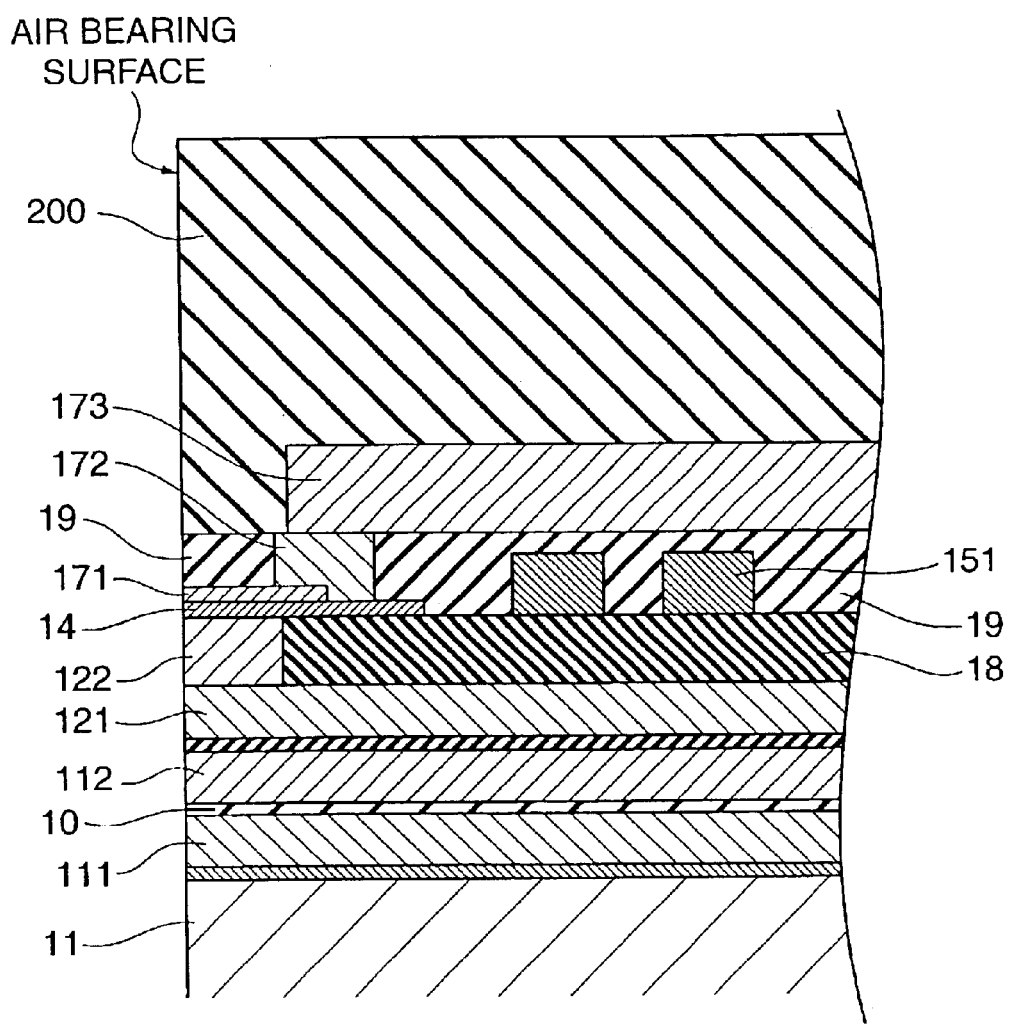
FIG. 8 is a sectional view of a thin film magnetic head, which is a third preferred embodiment of the invention.

A sectional view of a thin film magnetic head, which is a third preferred embodiment of the invention, is shown in FIG. 8. This thin film magnetic head is structured as a version of the second embodiment in which no insulating film 20 is used. Thus, the step of forming the insulating film 20 shown in FIG. 7I is skipped, resulting in a structure in which the upper third magnetic film 173 is stacked over a flat surface formed by the insulating film 19 and the upper second magnetic film 172.

This arrangement provides an advantage of reducing the number of steps and simplifying the structure.

(Embodiment 4)

Figure 9:
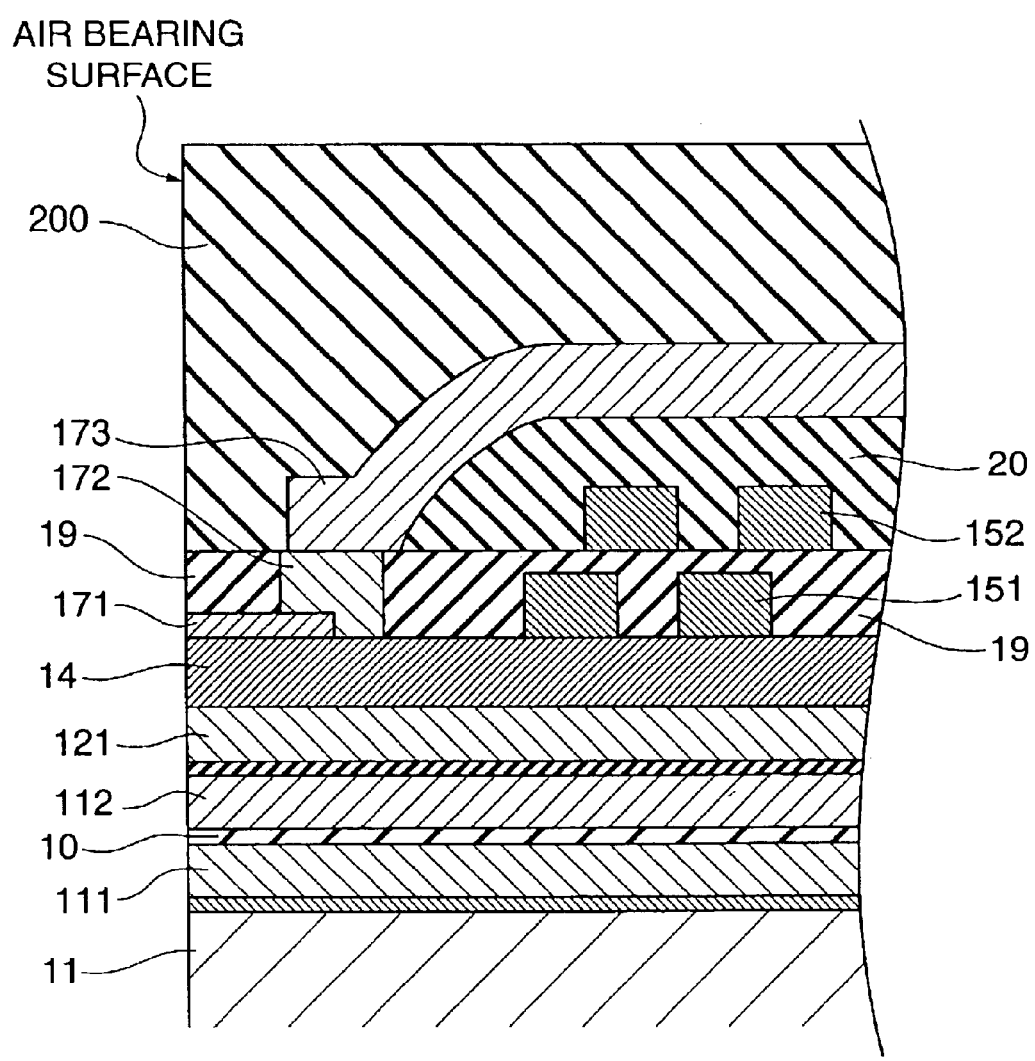
FIG. 9 is a sectional view of a perpendicular write thin film magnetic head to which the thin film magnetic head in the first mode of implementing the invention is applied.

FIG. 9 is a sectional view of the essential part of a thin film magnetic head, which is a fourth preferred embodiment of the invention. In this mode of implementing the invention, the first embodiment is applied to a single pole perpendicular write thin film magnetic head. As is the first embodiment, this thin film magnetic head is formed by successively stacking the read head section and the write head section over the substrate 11 consisting of alumina-based ceramics.

The description of the read head section is dispensed with because its structure is similar to that of the first embodiment. In the write head section, the lower first magnetic film 121 to serve as a return pole is formed, and over its surface is formed the magnetic gap 14. Then is formed the upper first magnetic film 171 which is to constitute a monopole to the lower first magnetic film 121 via the magnetic gap 14. This causes the lower first magnetic film 121 and the upper first magnetic film 171 to constitute the tip portion of the track part.

Further, the first conductor coil 151 is formed over the magnetic gap 14, and the upper second magnetic film 172 is formed so as to be in contact with the rear end in the reverse direction to that of the air bearing surface of the upper first magnetic film 171. Also the circumferences of the upper second magnetic film 172 and the first conductor coil 151 are covered with the insulating film 19. Then, after flattening the surfaces of the insulating film 19 and the upper second magnetic film 172, the second conductor coil 152 is formed over the insulating film 19. The circumference of the second conductor coil 152 is covered with the insulating film 20. The upper third magnetic film 173 is formed over the insulating film 20, and its tip portion is in contact with the upper second magnetic film 172. In this way, it is possible to form a perpendicular write thin film magnetic head suitable for a high recording density and making possible high speed transfers. Incidentally, its manufacturing method is basically to that for the thin film magnetic head in the first mode of implementing the invention.

Figure 10:
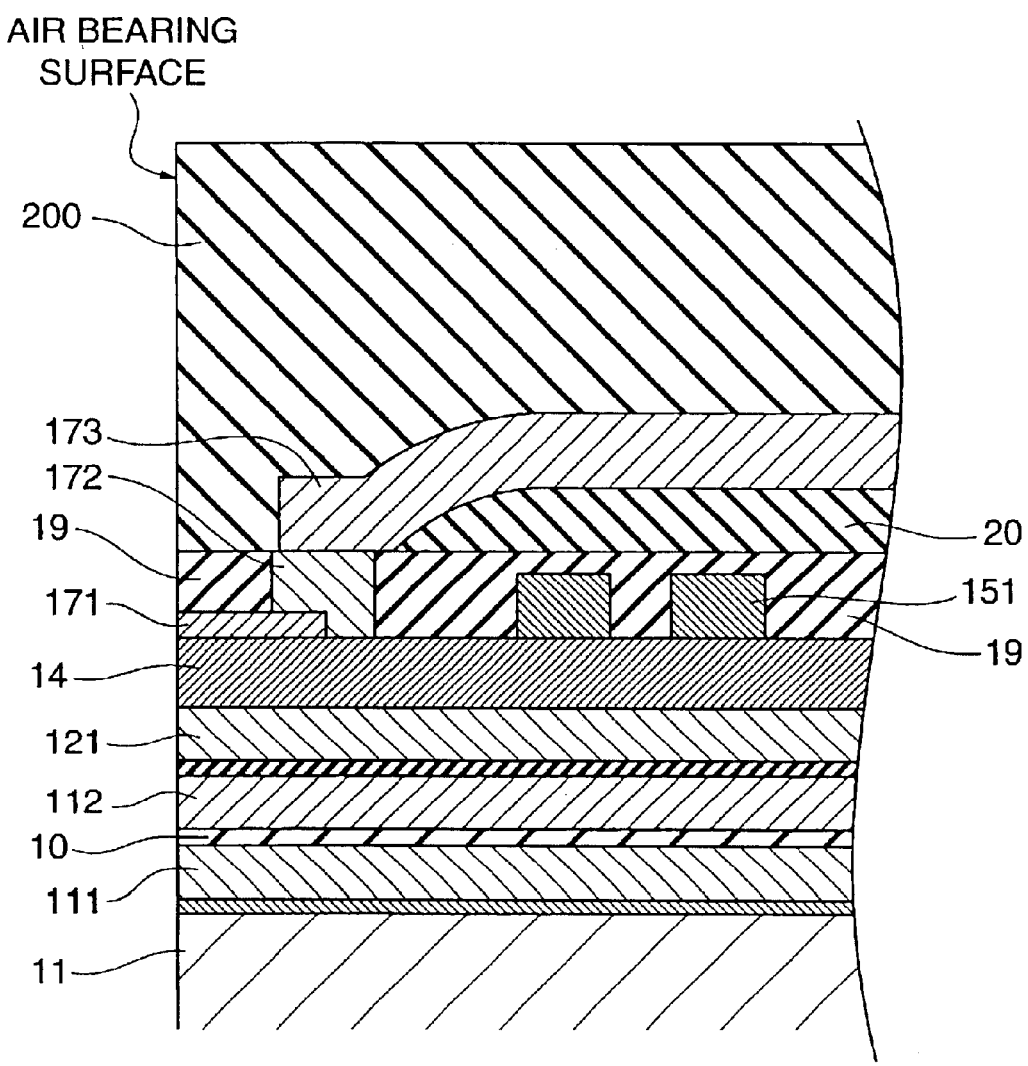
FIG. 10 is a sectional view of a perpendicular write thin film magnetic head to which the thin film magnetic head in the second mode of implementing the invention is applied.

To add, as shown in FIG. 10, it is also possible to apply the perpendicular write thin film magnetic head in the fourth mode of implementation to the structure of the magnetic head having a single layer of conductor coil shown as the second embodiment of the invention.

Figure 11:
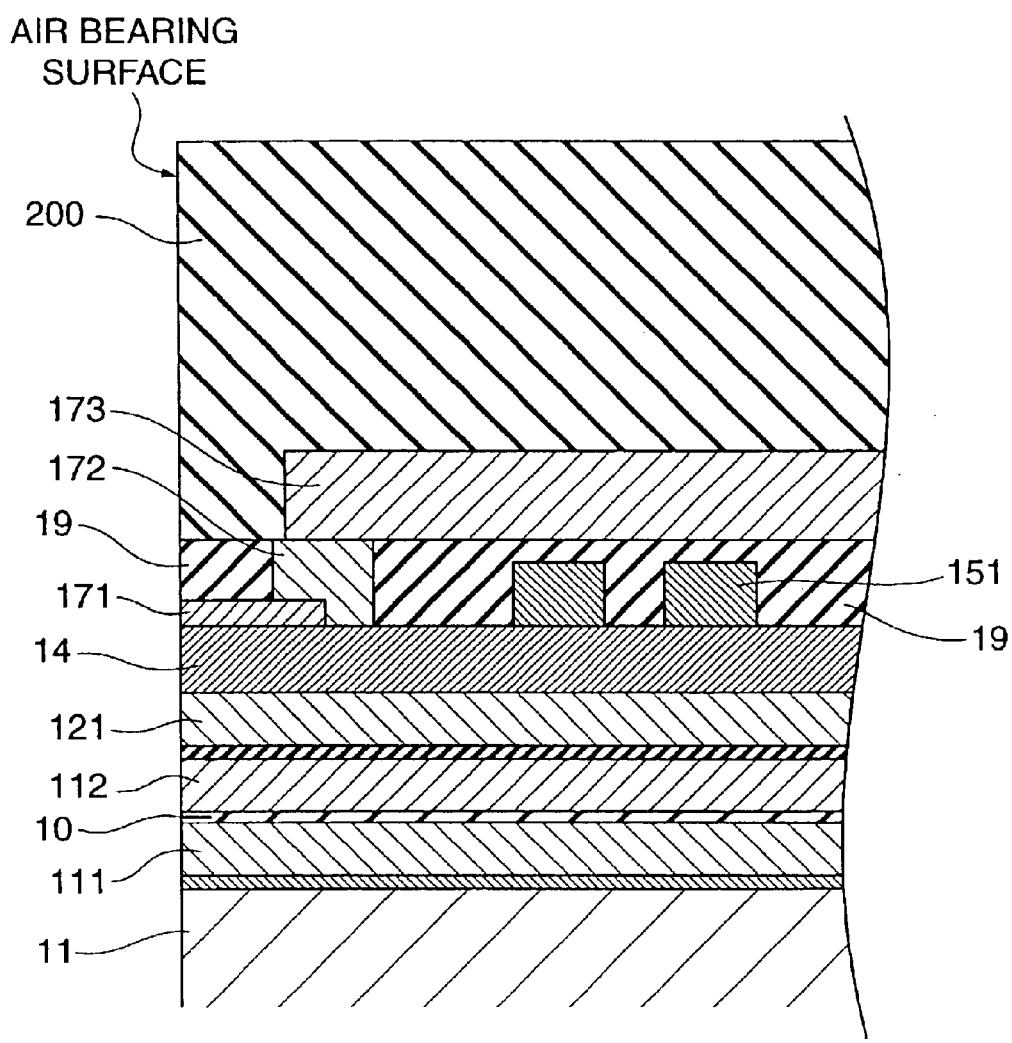
FIG. 11 is a sectional view of a perpendicular write thin film magnetic head to which the thin film magnetic head in the third mode of implementing the invention is applied.
Figure 12:
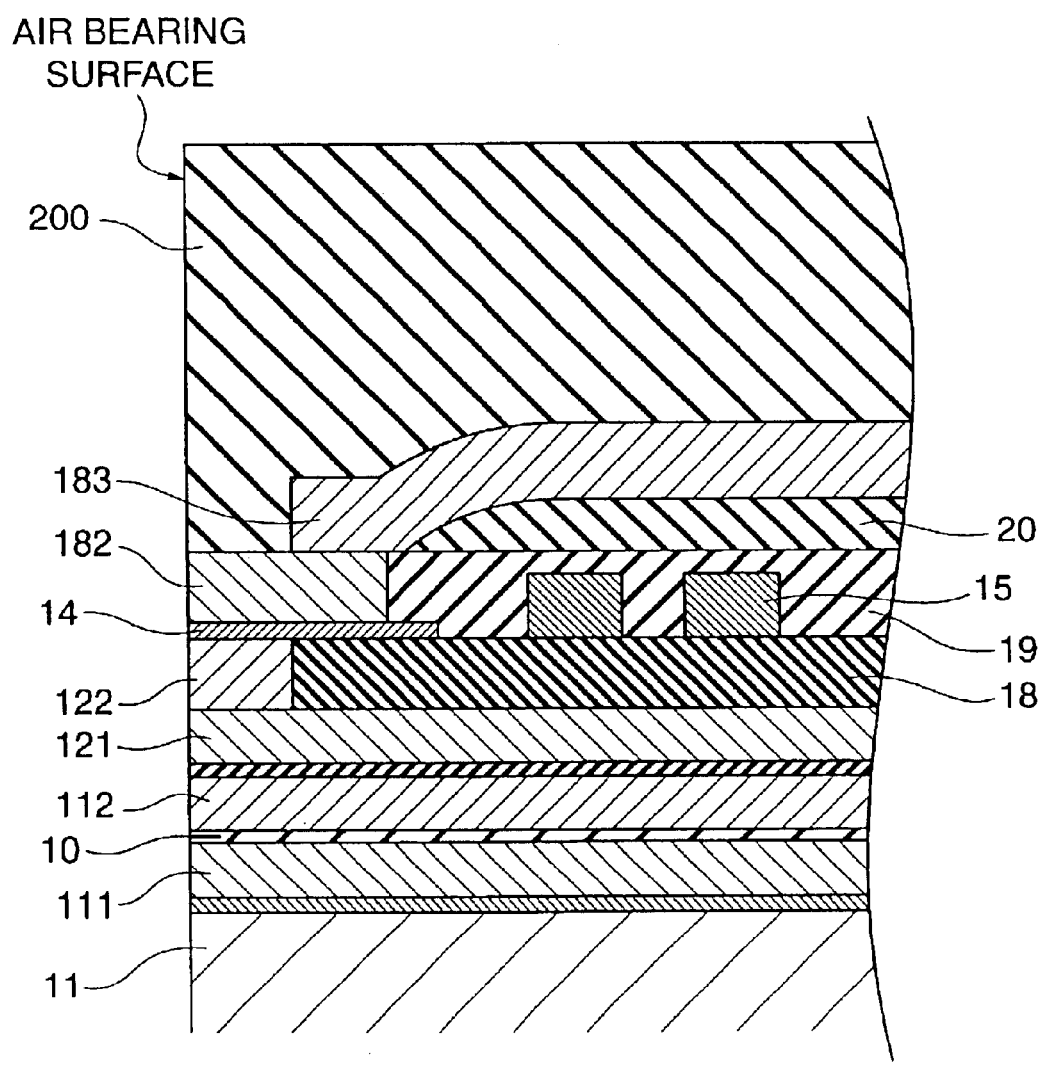
FIG. 12 shows a section of a magnetic head according to the prior art, whose upper magnetic film is split into a tip portion and a rear portion.
Figure 13A:
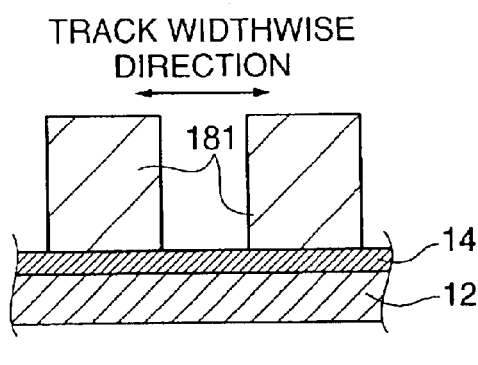
FIGS. 13A to 13G are diagrams showing how the tip portion of the upper magnetic film of the magnetic head of the structure according to the prior art is formed as viewed from the air bearing surface.
Figure 13E:
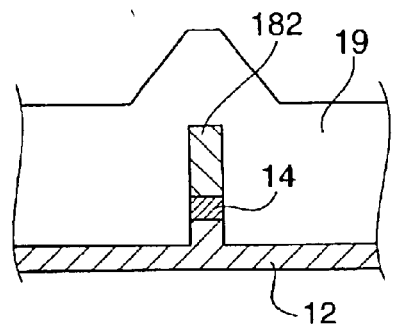
Figure 13B:
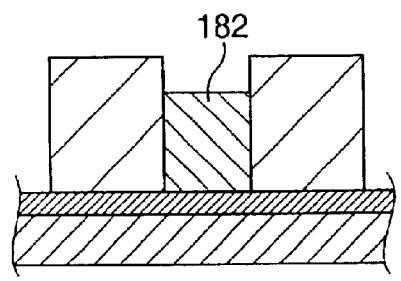
Figure 13F:
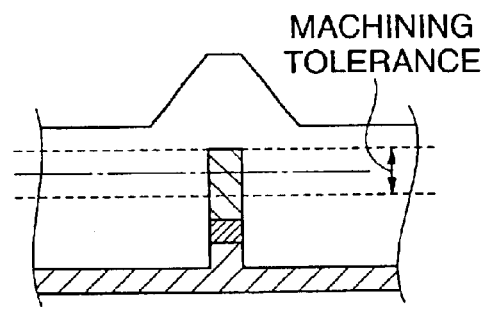
Figure 13C:
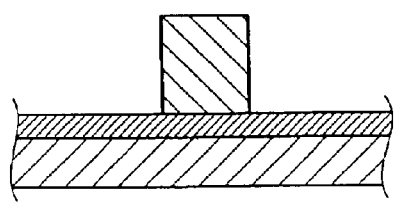
Figure 13G:
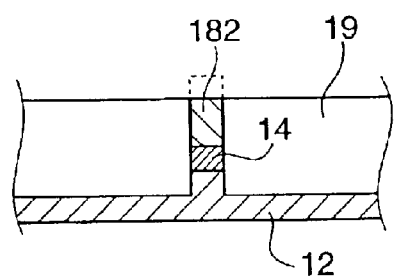
Figure 13D:
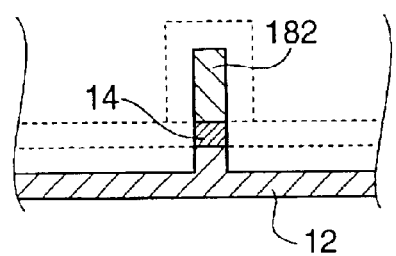

Further as shown FIG. 11, it is also possible to apply the perpendicular write thin film magnetic head in the fourth mode of implementation to the structure of the magnetic head using no insulating film 20 as shown in FIG. 9 and FIG. 10.

As hitherto described, as well as to planar magnetic write heads, the invention can be applied to a perpendicular magnetic write heads.

Also as hitherto described, the invention makes it possible to increase the precision of and to narrow the width which determines the track width of the upper magnetic film section. More specifically, by splitting the upper magnetic film section into three parts, particularly into the upper first magnetic film and the upper second magnetic film, a thin photoresist can be used for forming the track part emerging in the head air bearing surface. On the other hand, a thicker photoresist can be used for parts constituting planes.

Further, since the widths to determine the track width of the upper first magnetic film and the lower second magnetic film can be equalized, it is possible to reduce write blurring of signals onto the disk and accordingly to provide a thin film magnetic head capable of realizing a magnetic recording apparatus that can achieve a high recording density of 50 gigabits or even more per square inch, and a method for manufacturing the same.

What is claimed is:

1. A thin film magnetic head having a write head adjacent to a read head, wherein said write head comprises:
    a lower first magnetic film,
    a lower second magnetic film, provided over said lower first magnetic film on an air bearing surface side, for determining a track width,
    a first insulating film provided over said lower first magnetic film,
    a magnetic gap film provided over said first insulating film and said lower second magnetic film on the air bearing surface side,
    an upper first magnetic film provided over said magnetic gap film to determine the track width,
    an upper second magnetic film provided to be connected to a rear end of said upper first magnetic film,
    a coil provided over said first insulating film,
    a second insulating film provided so as to cover circumferences of the coil and said upper second magnetic film, and
    an upper third magnetic film provided over said second insulating film and said upper second magnetic film to be connected to said upper second magnetic film on the air bearing surface side and to said lower first magnetic film on a rear end side.

2. The thin film magnetic head according to claim 1, wherein a third insulating film is provided over said second insulating film and said upper third magnetic film is provided over the third insulating film.

3. The thin film magnetic head according to claim 1, wherein a thickness of said upper first magnetic film is thinner than that of said coil.

4. The thin film magnetic head according to claim 1, wherein the thickness of said upper first magnetic film is thinner than that of said upper second magnetic film.

5. The thin film magnetic head according to claim 1, wherein said upper second magnetic film has a flat face of the same height as said second insulating film.

6. The thin film magnetic head according to claim 1, wherein said lower second magnetic film has a flat face of the same height as said first insulating film.

7. The thin film magnetic head according to claim 1, wherein said second insulating film is also provided over said upper first magnetic film.

8. The thin film magnetic head according to claim 1, wherein said upper second magnetic film and said upper third magnetic film are positioned away from the air bearing surface.

9. The thin film magnetic head according to claim 1, wherein said coil has a two-layered structure and a third insulating layer is provided so as to cover the circumference of a second coil layer and said upper third magnetic film is provided over said third insulating film.

10. The thin film magnetic head according to claim 1, wherein an upper part of the air bearing surface of said lower second magnetic film has a protruding portion to determine the track width.

11. The thin film magnetic head according to claim 1, wherein an end of said lower second magnetic film on another side than the air bearing surface is positioned so as to determine a throat height=0.

12. A perpendicular write thin film magnetic head having a write head adjacent to a read head, wherein said write head comprises:
    a lower magnetic film,
    a magnetic gap film provided over said lower magnetic film,
    an upper first magnetic film, provided over said magnetic gap film on an air bearing surface side, for determining a track width,
    an upper second magnetic film provided to be connected to a rear end of said upper first magnetic film,
    a coil provided over said magnetic gap film,
    an insulating film so as to cover circumferences of said coil and said upper second magnetic film, and
    an upper third magnetic film provided over said insulating film and said upper second magnetic film to be connected to said upper second magnetic film on the air bearing surface side and to said lower magnetic film on a rear end side.

13. The perpendicular write thin film magnetic head according to claim 12, wherein a thickness of said upper first magnetic film is thinner than that of said coil.

14. The perpendicular write thin film magnetic head according to claim 12, wherein the thickness of said upper first magnetic film is thinner than that of said upper second magnetic film.

15. The perpendicular write thin film magnetic head according to claim 12, wherein said upper second magnetic film has a flat face of the same height as said insulating film.

16. The perpendicular write thin film magnetic head according to claim 12, wherein said insulating film is also provided over said upper first magnetic film.

17. The perpendicular write thin film magnetic head according to claim 12, wherein said upper second magnetic film and said upper third magnetic film are positioned away from the air bearing surface.

18. The perpendicular write thin film magnetic head according to claim 12, wherein said coil has a two-layered structure and a second insulating layer is provided so as to cover a circumference of a second coil layer and said upper third magnetic film is provided over said second insulating film.

19. A method for manufacturing a thin film magnetic head comprising:
    a step of forming an insulating film over a substrate and successively forming a lower shield film, a magnetoresistive element and an upper shield film to produce a read head,
    a step of forming a lower first magnetic film over said read head,
    a step of forming a lower second magnetic film having a width to determine a track width on an air bearing surface side of said lower first magnetic film and determining a position of a throat height=0,
    a step of forming a first insulating film over said lower first magnetic film,
    a step of flattening surfaces of said first insulating film and said lower second magnetic film,
    a step of forming a the magnetic gap film and a coil over said flattened surfaces,
    a step of forming an upper first magnetic film to determine the track width over said magnetic gap film,
    a step of forming an upper second magnetic film to be in contact with a rear end of said upper first magnetic film,
    a step of forming a second insulating film to cover circumferences of said upper first magnetic film, said upper second magnetic film and said coil,
    a step of flattening surfaces of said second insulating film and said upper second magnetic film, and
    a step of forming, over said flattened surfaces, an upper third magnetic film to be connected to said upper second magnetic film on the air bearing surface side and to said lower first magnetic film on a rear end side.

20. A method for manufacturing a perpendicular write thin film magnetic head comprising:
    a step of forming an insulating film over a substrate and successively forming a lower shield film, a magnetoresistive element and an upper shield film to produce a read head,
    a step of forming a lower magnetic film, a magnetic gap film and a coil over said read head,
    a step of forming an upper first magnetic film to determine a track width over said magnetic gap film on an air bearing surface side,
    a step of forming an upper second magnetic film to be in contact with a rear end of said upper first magnetic film,
    a step of coating said upper first magnetic film, said upper second magnetic film and said coil with an insulating film,
    a step of flattening surfaces of said upper second magnetic film and said insulating film, and
    a step of forming, over the flattened surfaces, an upper third magnetic film to be connected to said upper second magnetic film on the air bearing surface side and to said lower magnetic film on a rear end side.

* * * * *